United States Patent [19]

Story

[11] Patent Number: 4,978,396
[45] Date of Patent: Dec. 18, 1990

[54] PROCESS FOR PREPARING HIGH SOLIDS SLURRIES

[75] Inventor: Phillip M. Story, Yukon, Okla.

[73] Assignee: Kerr-McGee Chemical Corporation, Oklahoma City, Okla.

[21] Appl. No.: 351,061

[22] Filed: May 12, 1989

[51] Int. Cl.$^5$ ............................................... C09C 1/36
[52] U.S. Cl. ................................ 106/436; 106/444; 106/499
[58] Field of Search ........................ 106/436, 444, 499

[56] References Cited

U.S. PATENT DOCUMENTS

| | | | |
|---|---|---|---|
| 3,505,088 | 4/1970 | Luginsland et al. | 106/436 |
| 3,686,010 | 8/1972 | Solomka et al. | 106/436 |
| 3,821,359 | 6/1974 | Lewis, Jr. et al. | 106/436 |
| 3,981,978 | 9/1976 | Weiler et al. | 423/610 |
| 4,115,144 | 9/1978 | Chambers et al. | 106/300 |
| 4,152,176 | 5/1979 | Guhde | 106/436 |
| 4,280,849 | 7/1981 | Howard et al. | 106/436 |
| 4,288,254 | 9/1981 | Gladu | 106/436 |
| 4,448,609 | 5/1984 | Tear et al. | 106/308 |

*Primary Examiner*—William R. Dixon, Jr.
*Assistant Examiner*—Willie J. Thompson
*Attorney, Agent, or Firm*—Herbert M. Hanegan; John P. Ward

[57] ABSTRACT

A titanium dioxide pigment slurry containing from about 70 to about 80 percent by weight solids content is provided by dewatering, at superatmospheric pressure, a highly dispersed pigment slurry containing from about 20 to about 50 percent by weight of an untreated, nonflocculated titanium dioxide pigment and which slurry has a pH of below about 4.0 or above about 8.0 to produce a wet filter cake. The wet filter cake is reslurried in the presence of a dispersing agent. The high solids content slurry preferably is prepared from rutile titanium dioxide pigment.

16 Claims, No Drawings

PROCESS FOR PREPARING HIGH SOLIDS SLURRIES

FIELD OF THE INVENTION

The present invention relates to a process for preparing pigment slurries of high solids content. More particularly, the present invention relates to a process for preparing high solids content titanium dioxide pigment slurries suitable for use in paper manufacture.

BACKGROUND OF THE INVENTION

The paper manufacturing industry long has employed titanium dioxide pigment to enhance the optical properties, e.g., brightness and opacity, of various paper products. Traditionally, the titanium dioxide pigment which has been most widely employed, generally in high solids content slurry form, is dry milled anatase titanium dioxide. This pigment typically is produced by controlled hydrolysis of an aqueous solution of a titanium salt such as titanium sulfate and, after filtering and washing, calcined to dry the pigment and fully develop its anatase crystallographic form. For purposes of its use in paper manufacture, the calcined pigment is subjected to a further dry milling operation to break up oversized and agglomerated particles. The calcined and milled pigment then is dispersed in water in amounts sufficient to produce slurries having solids contents ranging from 60 to 80 percent by weight.

Rutile titanium dioxide pigments also are employed in paper manufacture and their use is becoming more prevalent as the production of anatase titanium dioxide pigments by the so-called "sulfate process" described above diminishes. Generally, the rutile pigments are prepared by oxidizing titanium tetrachloride in the vapor phase. The resulting oxidation product is a crude titanium dioxide pigment containing substantial amounts of oversized, gritty titanium dioxide particles. To render this crude product suitable for use as a pigment, it subsequently is wet milled, hydroclassified, dried and finally subjected to a dry milling operation to produce a smooth textured pigment product. When used in the manufacture of paper, this dried and milled pigment product is dispersed in water in amounts sufficient to provide slurries having solids contents in the range disclosed hereinabove for anatase pigments.

Whether the titanium dioxide pigments employed in preparing the high solids content slurries are prepared by the above generally described sulfate process or oxidation process, typically they are prepared from dry, finished pigments, i.e., pigments that have been subjected to drying and dry milling operations. One exception to the typical use of finished pigment is disclosed in U.S. Pat. No. 3,758,322. This patent describes a process for producing high solids content slurries using an in-process, low solids content slurry of crude titanium dioxide pigment which pigment has been wet ground and subjected to a grit removal step (i.e., classification) but no more. The process described comprises flocculating the grit-free, low solids content pigment slurry, dewatering said flocculated pigment slurry under vacuum and reslurrying the dewatered pigment to produce a slurry of at least 60% solids by weight. Although the process described is asserted to be more cost effective, as a result of the elimination of the costly and time consuming titanium dioxide finishing steps, it is not without its own disadvantages. One disadvantage is the added costs, in time and materials, associated with the need to flocculate the pigment to render it filterable utilizing conventional vacuum filtration techniques. Another disadvantage is the lower production rates associated with the process as the result of the long dewatering cycles required to produce the high solids content filter cakes used to prepare the final slurries.

The invention described hereinbelow overcomes the above disadvantages by eliminating the need for a flocculation step and the long dewatering cycles required to produce the high solids content filter cakes from which the final slurries are prepared.

SUMMARY OF THE INVENTION

The present invention provides a process for preparing high solids content slurries of untreated, nonflocculated rutile titanium dioxide pigment in an economical and efficient manner. Broadly, the process constituting the present invention comprises the steps of (1) providing an aqueous slurry containing water, a first dispersing agent and an untreated, nonflocculated titanium dioxide pigment; (2) dewatering the aqueous slurry of step (1) under elevated pressure conditions to form a wet filter cake containing the untreated, nonflocculated pigment; and (3) reslurrying the wet filter cake from step (2) by the addition thereto of at least a second dispersing agent whereby a pigment slurry characterized by a solids content of at least about 70 percent by weight is obtained.

DETAILED DESCRIPTION OF THE INVENTION

In accordance with the present invention a process is provided for the preparation of high solids content pigment slurries useful in the manufacture of paper products or coatings therefore. In its broadest aspects, the invention provides a means for preparing high solids content slurries of titanium dioxide pigments and particularly of untreated, nonflocculated titanium dioxide pigments. As used throughout this written description and appended claims, the term "untreated" pigment has reference to those titanium dioxide pigments the particles of which do not bear any surface coating of an hydrous metal oxide such as, for example, silica, titania, alumina and the like.

The untreated, nonflocculated titanium dioxide pigment to which the process of this invention is applicable includes any titanium dioxide pigment, whether anatase, rutile or mixtures thereof, produced in any manner including, for example, those produced by either of the above-mentioned sulfate and vapor phase oxidation processes. In a preferred embodiment, the process of this invention particularly is applicable to the preparation of high solids content slurries from untreated, nonflocculated rutile titanium dioxide pigments produced by the vapor phase oxidation of titanium tetrachloride.

Advantageously, the untreated, nonflocculated titanium dioxide pigments useful in preparing the high solids content pigment slurries in accordance with the present invention will be wet milled and thereafter hydroclassified to provide a pigment of substantially uniform particle size. In general, this is accomplished by first dispersing raw untreated titanium dioxide pigment which contains a substantial amount of oversized agglomerated pigment particles, in water as it exits the calciner or oxidation reactor to form a raw pigment slurry. Typically, the amount of untreated pigment dispersed in the water will be an amount sufficient to produce a raw pigment slurry containing from about 20 to about 50 percent by weight of the pigment.

Once the raw slurry has been prepared, it then is subjected to wet milling (or grinding) and hydroclassification to break up the oversize agglomerated pigment particles dispersed therein and to provide a slurry containing pigment of substantially uniform particle size. The wet milling of the slurry can be accomplished by any of the many known means heretofore employed by those of ordinary skill in this art. A particularly useful means for effecting the break up of the agglomerated pigment particles is a sand mill, the operation of which is fully described in Perry's *Chemical Engineer's Handbook*, Section 8, page 41, 4th Ed. (1963). The hydroclassification also can be accomplished utilizing known and conventional means and techniques such as, for example, the use of hydrocyclones. One example of a hydrocyclone and its use is illustrated in U.S. Pat. No. 3,130,157.

To maintain the untreated pigment in the above described wet milled and hydroclassified slurry in a highly dispersed state, a condition critical to the subsequent successful pressure filtration of the slurry, a first dispersing agent generally will be added to the slurry. This addition can be made either before or after the wet milling and hydroclassification of the raw slurry. However, it generally is preferred to make the addition prior to these operations. Broadly, the dispersant materials which can be employed as the first dispersing agent can include any of the known alkali metal phosphate compounds such as, for example, sodium hexametaphosphate, sodium and potassium polyphosphate, sodium pyrophosphate, and the like. The amount of such dispersant materials added to the raw slurry as the first dispersing agent can range broadly from about 0.01 to about 2.0 percent by weight of the raw slurry. Generally, a more preferred range for these dispersant materials is from about 0.1 to about 1.0 percent by weight.

In addition to the use of the above described dispersant materials, either a mineral acid such as hydrochloric or sulfuric acid or an inorganic base compound such as ammonia, alkaline earth or alkali metal hydroxide, carbonate or bicarbonate compounds will be added, when necessary, to the slurry to maintain the pH of the slurry at a value below about 4.0 and lower, or above about 8.0 and higher. Representative examples of such useful inorganic base compounds include, for instance, sodium hydroxide, potassium hydroxide, ammonium hydroxide, calcium hydroxide, sodium carbonate, sodium bicarbonate and the like. Generally, either hydrochloric acid or sulfuric acid can be used to maintain the slurry pH at a value below about 4.0 and lower while the preferred base compound used to maintain the slurry pH above about 8.0 and higher will be an alkali metal hydroxide such as, for instance, sodium hydroxide.

Maintaining the pH of the slurry at a value of below about 4.0 and lower, or above about 8.0 and higher is essential to retaining the untreated pigment in a nonflocculated condition. As disclosed hereinabove, such a condition has been found to be critical if the desired dewatering of the above described slurry using pressure filtration is to be achieved. On the other hand, when conventional vacuum filtration such as the use of vacuum drum filters is employed to produce a high solids content filter cake from a lower solids content slurry, it generally is desirable to maintain the slurry at a pH value between 4 and 8. Within this latter pH range, the pigment particles contained in the slurry carry essentially no ionic charge on the surface thereof. As a result, the pigment particles will readily undergo flocculation which renders the slurry containing them easier to dewater under vacuum filtration conditions. Preferably, in the practice of the present invention, the slurry will be maintained at a pH value of about 3.5 and lower, or about 8.5 and higher.

The highly dispersed, wet milled and hydroclassified pigment slurry then is subjected to dewatering. This dewatering will be performed using pressure filtration apparatus operated under superatmospheric pressure whereby a high solids content wet filter cake is produced. The particular pressure filtration apparatus employed to produce the high solids content wet filter cake, does not form a part of the present invention and any of the known pressure filtering apparatus can be used. Such apparatus include, for example, batch and intermittently operated filter presses of various types and designs, a complete description of which appears in Perry's *Chemical Engineer's Handbook*, Section 19, pp. 62–73, 4th Ed. (1963). A particularly useful filter press is a vertically positioned filter press manufactured by B. C. Hoesch Industries, Inc. This particular filter press combines the desirable characteristics of conventional filter presses with the advantage of rotary and belt filters and is fully automated.

Regardless of the particular type or design of filter press apparatus employed in the practice of this invention, such apparatus will be operated at pressures in excess of atmospheric pressure. For purposes of the present invention, typical operational pressures will range from about 50 to about 250 psi (or about 3.5 to about 17.5 kg/cm$^2$) and preferably from about 100 psi to about 225 psi (or about 7 to about 15.8 kg/cm$^2$).

The aqueous slurry, once introduced into the filter press, will be retained in the filter press under the superatmospheric pressures disclosed above for a period sufficient to produce a wet filter cake containing a solids content of at least about 70 percent by weight and higher. Generally, the time required to produce such a wet filter cake will range from about 10 to about 30 minutes. These times represent a typical filtration cycle, which cycle includes filling, pressing, drying and discharging of the wet filter cake from the press. It is to be understood that these times can vary depending upon the pigment content of the original aqueous slurry, the pressure employed in the filter press and the particular solids content required in the resulting wet filter cake in order to provide, upon reslurrying of the filter cake, a finished slurry having a particular high solids level. However, it is within the skill of the ordinary worker to readily determine the precise times required to obtain a wet filter cake having the requisite high solids content.

The wet filter cake, which as aforementioned, will contain a solids content of at least about 70 percent by weight and higher and, more particularly, between about 70 and about 80 percent by weight, then is reslurried to produce the desired final slurry product. Broadly, the wet filter cake can be reslurried merely by adding a second dispersing agent to the wet filter cake with mechanical agitation. Dispersant materials suitable for use as the second dispersing agent can be any of the known water soluble organic dispersant materials employed for such purposes. Thus, such materials will include, for instance, substituted alphatic carboxylic acids and the alkali metal and acid salts thereof, polyhydric alcohols, and alkanolamines and the like. Representative, but nonlimiting, examples of such materials include citric and tartaric acid and the sodium and potassium salts thereof, sorbitol, mannitol, monoethanolamine, triethanolamine, 2-amino-2-methyl-1-propanol and the like. If desired, mixtures of two or more of such materials can be employed.

The amount of the dispersant material added to the filter cake will be an amount in the range of from about 0.1 to about 5 percent by weight based on the weight of the titanium dioxide pigment contained in the final high solids content slurry product. Preferably, this amount will range from about 0.3 to about 1.5 percent by weight.

As disclosed hereinabove, the final high solids content slurry product can be produced merely by addition of the second dispersing agent to the wet filter cake recovered in the pressure filtration step of the invention. In this aspect of the invention, the resulting high solids content slurry product will contain essentially the same solids content as the wet filter cake from which it was derived. In general, however, water also will be added to the wet filter cake, along with the second dispersing agent, to provide adjustment of the solids content of the final slurry product to any desired predetermined level. The precise amount of water added to effect this adjustment, given the solids content of the wet filter cake and the solids content desired in the final slurry product, readily can be determined by one of ordinary skill in this art. However, in no event will the water added be an amount which is effectively capable of reducing the solids content in the final slurry product below about 70 percent by weight. Preferably, the solids content of the final slurry product produced in accordance with the present invention will range from about 70 to about 80 percent by weight.

In addition to the above described dispersant materials useful as the second dispersing agent, other materials also can be incorporated into the high solids content slurry at this time. Such materials will include various bactericides, fungicides, sequestering agents, and the like. When included in the high solids content slurries of this invention, the amounts of these materials will range, collectively, from about 0.1 to about 5 percent by weight of the slurry.

The invention is further described and illustrated by the following nonlimiting example. All parts and percentages set forth therein are by weight unless otherwise indicated.

EXAMPLE

A high solids content pigment slurry was prepared in accordance with the present invention as follows:

A highly dispersed, low solids content feed slurry was prepared by dispersing in water a raw, untreated, rutile titanium dioxide pigment produced by the vapor phase oxidation of $TiCl_4$. Sufficient quantities of this raw pigment were dispersed in the water such that the resulting raw pigment slurry contained a solids content of between 32 and 35 percent by weight. To facilitate the dispersion of the raw pigment in the water, sodium hexametaphosphate was added concomitantly therewith. To prevent flocculation of the raw pigment, the pH of the slurry was adjusted to a value of about 10 by the addition thereto of sodium hydroxide and the slurry finally subjected to wet milling and hydroclassification.

The resulting slurry then was intermittently pumped into a Hoesch Model PF1-2.5 vertical pressure filter (manufactured by B. C. Hoesch Industries, Inc.) having a total filter area of about 27 square feet ($2.5m^2$) wherein the slurry was dewatered, under a pressure of about 125 psig (7.8 kg/cm$^2$), at a nominal filtration rate of 10 pounds/hour/square foot (48.8 kg/hour/m$^2$) of filter surface. Dewatering of the slurry was continued until approximately 5680 pounds (2573 kg) of wet filter cake was produced. The solids content of the wet filter cake recovered from the pressure filter was about 78.9 percent by weight.

This wet filter cake was transferred to a 1000 gallon high speed disperser to which were added 576 pounds (261 kg) of water, 44 pounds (20 kg) of 2-amino-2-methyl-1-propanol, 13 pounds (6 kg) of citric acid (50% solution) and 4.0 pounds (1.8 kg) of Dowcil (a bactericide available from the Dow Chemical Co.). The wet filter cake and added materials then were subjected to high speed stirring for a period of about 20 minutes whereby a flowable and pumpable final, high solids content slurry was produced.

Analysis of the above final slurry revealed it to possess a solids content of 71 percent by weight, a viscosity of 658 centipois (as measured on a Brookfield model RVT viscometer using a No. 3 spindle at 100 rpm), a pH of 10.3 and a specific resistivity of 400 ohm-cm. This slurry, when subsequently employed in a filled and coated paper application, exhibited good brightness and opacity characteristics.

As is apparent from the above Example, a high solids content pigment slurry can be prepared in accordance with the process of this invention in an efficient and economical manner. Furthermore, it is clear from the above that the high solids content slurry is easily produced without the need to flocculate the original feed slurry and without the need for the long filtration times of the prior art to achieve the solids content levels desired.

While the present invention has been described in detail with regard to what at present is considered to be the preferred embodiments thereof, it is to be understood that changes and modifications can be made thereto without departing from the scope and spirit of the invention as described above and as defined in the following claims.

What is claimed is:

1. A process for preparing a high solids content pigment slurry consisting essentially of the steps of:
    providing an aqueous, highly dispersed pigment slurry comprised of water, a first dispersing agent comprising an alkali metal phosphate compound and an untreated, nonflocculated titanium dioxide pigment said pigment being present in said slurry in an amount sufficient to provide a solids content in said slurry of at least about 20 percent by weight, said slurry being maintained at a pH level of about 8.0 and higher or about 4.0 and lower to prevent flocculation of said titanium pigment;
    dewatering said highly dispersed pigment slurry under superatmospheric pressure conditions sufficient to produce a wet filter cake containing a solids content of said untreated, nonflocculated pigment of at least about 70 percent by weight; and
    reslurrying said wet filter cake by adding thereto a second dispersing agent comprising a water soluble organic material whereby a pigment slurry having a pigment content of at least about 70 percent by weight is obtained.

2. The process of claim 1 wherein said first dispersing agent is present in said highly dispersed pigment slurry in ranges from about 0.01 to about 2.0 percent by weight.

3. The process of claim 1 wherein said highly dispersed pigment slurry further contains a base compound comprising an alkali metal hydroxide in an amount sufficient to maintain the slurry at said pH of about 8.0 and higher or a mineral acid selected from the group consisting of hydrochloric and sulfuric acids in an amount sufficient to maintain the slurry at said pH of about 4.0 and lower.

4. The process of claim 3 wherein said highly dispersed pigment slurry is maintained at a pH of about 3.5 and lower or about 8.5 and higher.

5. The process of claim 1 wherein said highly dispersed pigment slurry is dewatered at a superatmospheric pressure of at least about 50 pounds per square inch (3.5 kg/cm$^2$).

6. The process of claim 1 wherein said pressure ranges from about 50 pounds per square inch (3.5 kg/cm$^2$) to about 250 pounds per square inch (17.5 kg/cm$^2$).

7. The process of claim 1 wherein said second dispersing agent comprising said water soluble organic material is an organic material selected from the group consisting of substituted aliphatic dicarboxylic acids and the alkali metal salts thereof, polyhydric alcohols and alkanolamines.

8. The process of claim 7 wherein said second dispersing agent is added to said wet filter cake in an amount of from about 0.1 to about 5 percent by weight.

9. A process for preparing a high solids content titanium dioxide pigment slurry consisting essentially of the steps of:
providing an aqueous, highly dispersed titanium dioxide pigment slurry, said slurry being comprised of water, from about 0.01 to about 2.0 percent by weight of an alkali metal phosphate compound, an alkali metal hydroxide in an amount sufficient to maintain said slurry at a pH of about 8.5 and higher and sufficient untreated, nonflocculated titanium dioxide pigment to provide in said slurry a solids content of at least about 20 percent by weight;
dewatering said highly dispersed pigment slurry by filtering said pigment slurry at a superatmospheric pressure of at least about 50 pounds per square inch gauge to produce a wet filter cake containing a solids content of said nonflocculated pigment of at least about 70 percent by weight; and
reslurrying said wet filter cake by adding thereto from about 0.1 to about 4.0 percent by weight of a second dispersing agent comprising a water soluble organic material selected from the group consisting of substituted aliphatic carboxylic acids and the alkali metal salts thereof, polyhydric alcohols and alkanolamines whereby a pigment slurry having a solids content of at least about 70 percent by weight is obtained.

10. The process of claim 8 wherein said titanium dioxide pigment is present in said highly dispersed pigment slurry in an amount sufficient to provide a solids content in said slurry of from about 20 to about 50 percent by weight.

11. The process of claim 8 wherein said untreated nonflocculated titanium dioxide pigment present in said highly dispersed pigment slurry is untreated, rutile titanium dioxide pigment.

12. The process of claim 9 wherein said second dispersing agent is added to said wet filter cake in an amount of from about 0.3 to about 1.5 percent by weight.

13. The process of claim 9 wherein said dewatering of said highly dispersed pigment slurry is carried out by filtering said pigment at a superatmospheric pressure of from about 50 pounds per square inch (3.5 kg/cm$^2$) to about 250 pounds per square inch (17.5 kg/cm$^2$).

14. The process of claim 9 wherein said second dispersing agent added to said wet filter cake is an alkanolamine.

15. The process of claim 14 wherein said second dispersing agent is a 2-amino-2-methyl-1-propanol.

16. A high solids content pigment slurry prepared by the process of claim 1.

* * * * *